(No Model.)

G. A. F. MILDT.
BAKING PAN.

No. 599,246.    Patented Feb. 15, 1898.

WITNESSES:
William M. Miller
Chas. E. Poensgen.

INVENTOR
Gustav A. F. Mildt
BY
Hauff & Hauff
ATTORNEYS

UNITED STATES PATENT OFFICE.

GUSTAV A. F. MILDT, OF LONG ISLAND CITY, NEW YORK.

BAKING-PAN.

SPECIFICATION forming part of Letters Patent No. 599,246, dated February 15, 1898.

Application filed September 2, 1897. Serial No. 650,411. (No model.)

*To all whom it may concern:*

Be it known that I, GUSTAV A. F. MILDT, a subject of the King of Prussia, residing at Long Island City, in the county of Queens and State of New York, have invented new and useful Improvements in Baking-Pans, of which the following is a specification.

This invention relates to a baking-pan which can be expeditiously manipulated and which serves for baking bread, cake, loaves, and the like; and the invention resides in the novel features of construction set forth in the following specification and claims and illustrated in the annexed drawings, in which—

Figure 1:
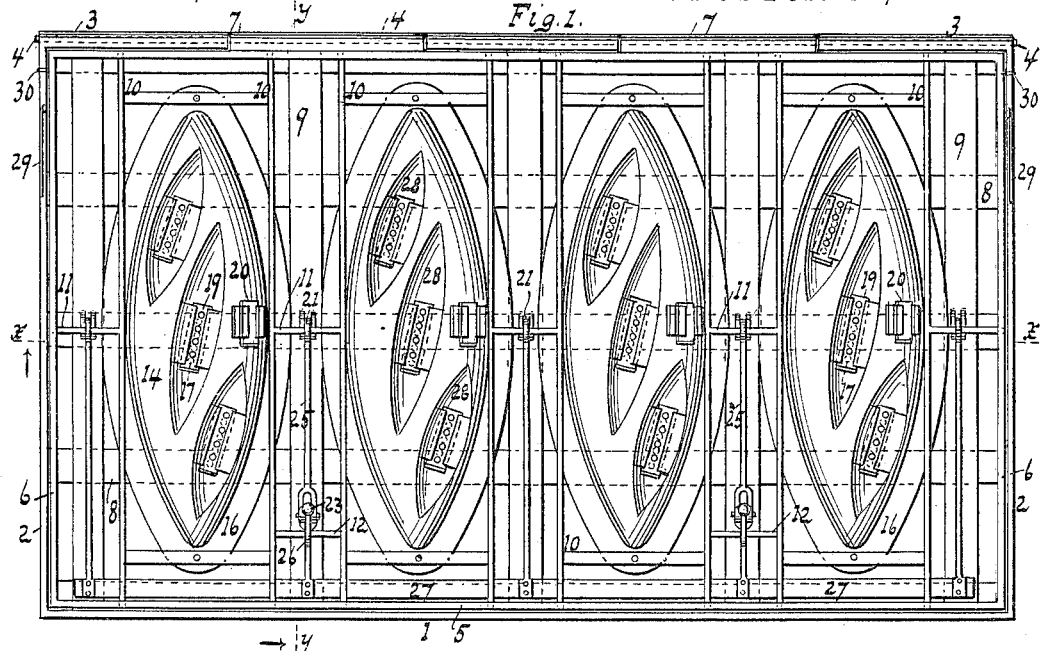
Figure 2:
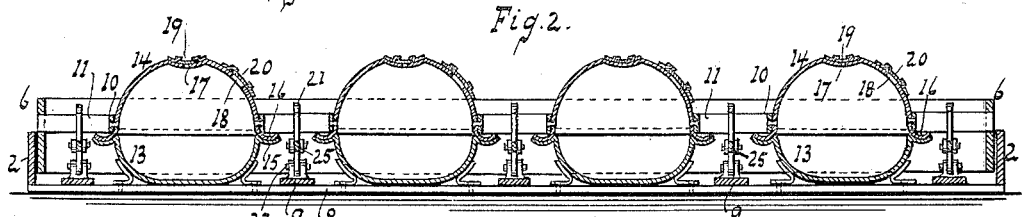
Figure 3:
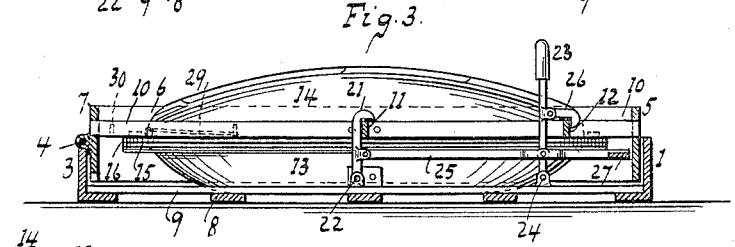
Figure 4:
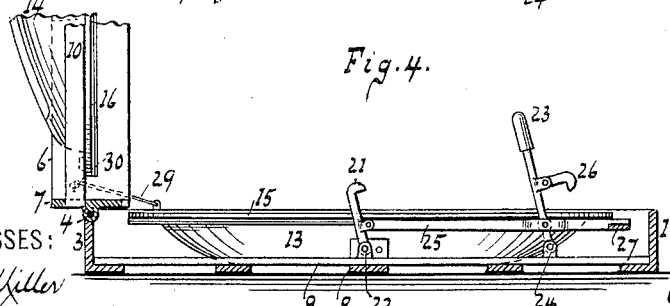

Figure 1 is a plan view of baking-pans. Fig. 2 is a section along $x\,x$, Fig. 1. Fig. 3 is a section along $y\,y$, showing a pan closed. Fig. 4 is a view like Fig. 3, showing the pan open.

In the drawings is shown a frame or rack comprising sections jointed to one another. The lower frame-section is shown with its front piece or rail at 1, its sides at 2, and its back at 3. The joint or hinge 4 connects the sections. The upper section is shown with its front at 5, its side pieces or rails at 6, and its back at 7. The lower section has its bottom opened or formed by the crossing pieces or strips 8 and 9, so that heat can rise through the frame. The upper section is shown with the pieces or braces 10 placed transversely, to which are formed shorter braces 11. At suitable points there are also braces 12, for a purpose to be presently explained.

The frame could be provided with one pan, but by being provided with a series of pans of suitable material can be used for baking more than one loaf or mass at a time. Each pan is shown comprising sections 13 and 14. The lower pan-section 13 is riveted or suitably secured to the lower frame-section, and the upper pan-section 14 is suitably secured at its sides and ends to the upper frame-section, said pan-sections having rims 15 and 16, of trough shape, as seen in Fig. 2, to fit or engage one another. Said pan-sections when being closed or superposed can be readily placed or kept in proper relative position to one another.

Each upper pan-section is shown provided with vent-holes 17, Fig. 2, and with a sight-hole 18. The slides 19 are perforated to correspond to the vent-holes or perforations 17, so that as the perforations in slides 19 are brought into or out of register with perforations 17 the vapor in the pan can be allowed suitable escape or confined, as required. The slide 20 for closing sight-hole 18 can be withdrawn, as required, to note the progress or degree of baking.

The lower frame-section 1 2 3 has one or more swinging hooks 21 jointed to the lower frame-section at 22, as also one or more handles or levers 23 jointed at 24. A link 25 is pivoted to or connects the hook and handle. When the upper frame-section 5 6 7 is closed or lowered, Fig. 3, the handle 23 can be swung to cause link 25 to draw or move hook 21 to engagement with brace 11. The frame and pan sections are thus held closed or locked.

The handle 23, when having its swinging catch 26 engaged to brace 12, Fig. 3, is held against accidentally swinging or moving the hook 21 out of engagement. Said catch 26, when required, can be readily swung clear from brace 12. When a series of hooks 21 and handles 23 are employed, said several hooks and handles can be made to move in unison by a connecting piece or bar 27, by which links 25 are connected to one another.

The pans can of course be variously formed to provide loaves of different appearance or ornamentation or to secure a twist or embossed appearance for the loaves, as required, and said pans can be adapted or formed not only for baking bread, but also for other goods—as, for example, cake or pastry.

The braces 11 are shown at or about a median line of the frame; but such braces or additional braces with hooks 21 could be placed nearer the front 5, if desired or found advantageous, for firmly holding the upper frame-section locked.

The vent-holes 17 with slides 19, as seen in Fig. 1, are shown at certain bosses or dents 28 in the upper pan-section; but, if required, such holes and slides could be placed between these bends 28 or at other points, as required, and two or more slides 19 could be connected to one another to open and shut simultaneously. The upper frame-section when open can be held in position by a suitable catch or hook and eye 29 and 30.

The lower frame-section can be provided with bails or handles of suitable form at the sides for convenient lifting or carrying, and the upper frame could likewise have a handle for enabling this upper frame-section to be readily lifted or swung open.

Sight-openings 18 could be placed opposite one another in each pan-section 14 to allow a sight through such section, if required, and such sight-openings could be left open or closed by suitable transparent material, as mica.

Instead of having only one hook 21 at a link 25 a series or row of such hooks could be placed along such link.

What I claim as new, and desire to secure by Letters Patent, is—

1. A frame or rack comprising sections jointed to one another, and a series of pans, each pan comprising sections secured respectively to the frame-sections and having trough-shaped rims adapted to fit or engage one another for adjusting the pan-sections substantially as described.

2. A frame or rack comprising sections jointed to one another, and a pan comprising sections secured respectively to the frame-sections, one frame-section having a swinging hook and lever linked to one another, said lever being provided with a catch, and the other frame-section having braces for the engagement of the hook and catch substantially as described.

3. The combination with a frame or rack comprising a lower section having an open framework bottom and an upper section hinged thereto, of a series of pans, each pan comprising a top and bottom, the bottoms of the pans being attached to the bottom framework of the lower section of the frame or rack and the tops to the upper section, a swinging hook carried by the lower section and arranged to engage the upper section to hold the pans closed, and a catch operating to hold said hook against accidental displacement, substantially as described.

In testimony whereof I have hereunto set my hand in the presence of two subscribing witnesses.

GUSTAV A. F. MILDT.

Witnesses:
WM. C. HAUFF,
E. F. KASTENHUBER.